United States Patent [19]

Peters et al.

[11] 4,224,668
[45] Sep. 23, 1980

[54] CONTROL STORE ADDRESS GENERATION LOGIC FOR A DATA PROCESSING SYSTEM

[75] Inventors: Arthur Peters, Sudbury; Virendra S. Negi, Pepperell, both of Mass.

[73] Assignee: Honeywell Information Systems Inc., Waltham, Mass.

[21] Appl. No.: 864

[22] Filed: Jan. 3, 1979

[51] Int. Cl.² .............................................. G06F 9/20
[52] U.S. Cl. ................................................ 364/200
[58] Field of Search ... 364/200 MS File, 900 MS File

[56] References Cited

U.S. PATENT DOCUMENTS

| | | | |
|---|---|---|---|
| 3,828,320 | 8/1974 | Dinerman et al. | 364/200 |
| 3,969,724 | 7/1976 | Anderson et al. | 364/200 |
| 4,003,033 | 1/1977 | O'Keefe et al. | 364/200 |
| 4,025,906 | 5/1977 | Riikonen | 364/200 |
| 4,042,972 | 8/1977 | Gruner et al. | 364/200 |
| 4,067,058 | 1/1978 | Brandstaetter et al. | 364/200 |
| 4,067,059 | 1/1978 | Derchak | 364/200 |
| 4,084,229 | 4/1978 | Taylor et al. | 364/200 |
| 4,086,626 | 4/1978 | Chung | 364/200 |
| 4,099,229 | 7/1978 | Kancler | 364/200 |

*Primary Examiner*—Mark E. Nusbaum
*Attorney, Agent, or Firm*—John S. Solakian; Nicholas Prasinos; Ronald T. Reiling

[57] ABSTRACT

A control store in a data processor is addressed by means of next address generation logic which includes a first multiplexer utilized to address the control store, which multiplexer has several inputs. One of such inputs is received from a latching mechanism which allows more than one test condition to be simultaneously utilized for addressing the control store on a free flow basis. These test conditions, as well as information from an addressed control word, are utilized in a multiplexed arrangement as one input of the first multiplexer. By use of other inputs of such first multiplexer, the control store may be addressed by use of branch address information, as well as other test condition information. A page register provides the page address, to a plurality of pages included in this control store with the locations in each such page addressed by use of the above noted multiplexer combination.

10 Claims, 15 Drawing Figures

|  | RDXXBR | | | POSSIBLE CODES | & | CORRESPONDING MICROS |
|---|---|---|---|---|---|---|
|  | 38 | 39 | 40 |  |  |  |
| NEXAS0 | 1 | X | X | 100<br>101<br>110<br>111 |  | BRM/BRMEX/BMA |
|  | OR |  |  | 010 |  | - RAS |
|  | X | 1 | X | 011 |  |  |
| NEXAS0̄ | 0 | 0 | X | 000<br>001 |  | - BUN<br>- BTS |
| NEXAS1 | 1 | X | X | 100—<br>101—<br>110—<br>111— |  | BRM/BRMEX/BMA |
|  | OR |  |  | 001 |  | - BTS |
|  | X | X | 1 | 011 |  |  |
| NEXAS1̄ | 0 | X | 0 | 000<br>010 |  | - BUN<br>- RAS |

*FIG. 9*

CONTROL STORE ADDRESS GENERATION LOGIC FOR A DATA PROCESSING SYSTEM

RELATED APPLICATIONS

The following applications are incorporated by reference to the instant application.

1. "Binary Coded Decimal Correction Apparatus" invented by Virendra S. Negi and Arthur Peters, filed on even date herewith and having Ser. No. 000,735 and assigned to the same assignee named herein.
2. "Control File Apparatus for a Data Processing System" invented by Virendra S. Negi and Arthur Peters, filed on even date herewith and having Ser. No. 000,733 and assigned to the same assignee named herein.
3. "Arithmetic Logic Apparatus for a Data Processing System" invented by Virendra S. Negi and Arthur Peters, filed on even date herewith and having Ser. No. 000,842 and assigned to the same assignee named herein.

BACKGROUND OF THE INVENTION

The present invention generally relates to data processing systems and more particularly to a control store addressing apparatus associated therewith.

It has become common place in the computer industry to develop data processors which include control stores which include a plurality of control or firmware words which are utilized to control the operation of such processors. These control stores are addressed based upon the contents of such control store words as well as other inputs depending upon the operation being executed in such data processor. In such next address generation logic it is important that the status of more than one test condition be simultaneously utilized to address the control store. If this were not provided, it would require loading of each one of these status or test conditions into, for example, a register on a clocked cycle basis. This would have to be done each time these test conditions change. It is accordingly desirable to test more than one such function, up to four such functions for example, simultaneously without having to load them into a clocked register. By providing such capability, the addressing of such control store is faster, and, accordingly, the overall performance of the data processor is increased.

It is accordingly a primary object of the present invention to provide an improved control store addressing mechanism for use in a data processing system.

SUMMARY OF THE INVENTION

The above stated object and other objects are achieved according to the present invention by providing a data processing system which includes a control store having a plurality of locations, each of such locations for storing a control word for use in controlling the operation of the processor. Apparatus is also included for receiving a plurality of signals indicative of status information of the data processor, for receiving an instruction indicative of address information for use in addressing the control store, and apparatus for receiving a first selected portion of an addressed one of the control words. A first multiplexer apparatus is also provided, which has an output, which first multiplexer apparatus enables the coupling to the output thereof, such signals indicative of the status information or the first selected portion of the addressed one of the control words. Apparatus is also provided for decoding the information received by the apparatus for receiving the instruction indicative of such address information. A third apparatus is provided for selecting either the signals or the first selected portion at the output of the first multiplexer apparatus or for selecting the information received from the apparatus for decoding. Second multiplexer apparatus is provided having an output and a plurality of inputs, a first one of the inputs coupled to the apparatus for selecting and a second one of the inputs coupled to a second portion of an addressed one of the control words from the control store. Further apparatus is provided for addressing the control store by means of one of the inputs received by the second multiplexer apparatus.

BRIEF DESCRIPTION OF THE DRAWINGS

The above and other objects of the present invention are achieved in the illustrative embodiment as described with respect to the figures in which:

FIG. 9 is a truth table illustrative of the operation of the logic of FIG. 7A.

DETAILED DESCRIPTION OF THE PREFERRED EMBODIMENT(S)

Figure 1:
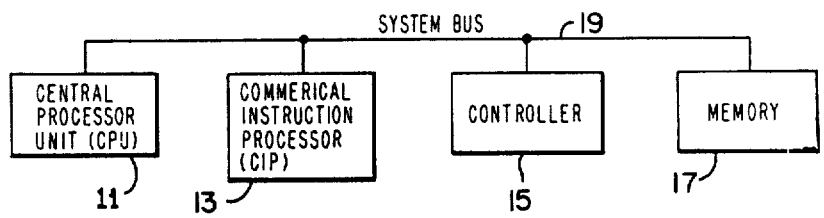
FIG. 1 illustrates the overall system configuration which incorporates the present invention.

The purpose of the CIP 13 is to expand the CPU 11, shown in the system configuration of FIG. 1, instruction set capabilities by using a powerful set of commercial type instructions. These instruction types allow the CPU, via the CIP, to process decimal and alphanumeric data; the instruction types are listed as folows: Decimal, Alphanumeric, Data Conversion and Editing. CIP communication with the CPU and main memory 17 is over a common system bus 19. The CIP operates as an attachment to the CPU and receives instructions and operands as transfers from the CPU and/or memory. The CIP executes the commercial instructions as they are sent over the bus 9 by the CPU 11. The CPU obtains these instructions from main memory, examining each fetched instruction specifically for a commercial instruction. Receipt of each commercial instruction by the CIP is usually concurrent with the CPU, as the CPU extracts and decodes each instruction from memory. However, CIP instruction execution is asynchronous with CPU operations. Any attempt to execute a commercial instruction when a CIP is not installed in the system causes the CPU to enter a specific trap condition.

The CIP receives information from the CPU and main memory via the bus 19, and processes this information in a logical sequence. This sequence consists of four CIP operational states as follows: idle state, load state, busy state and trap state.

Figure 2:
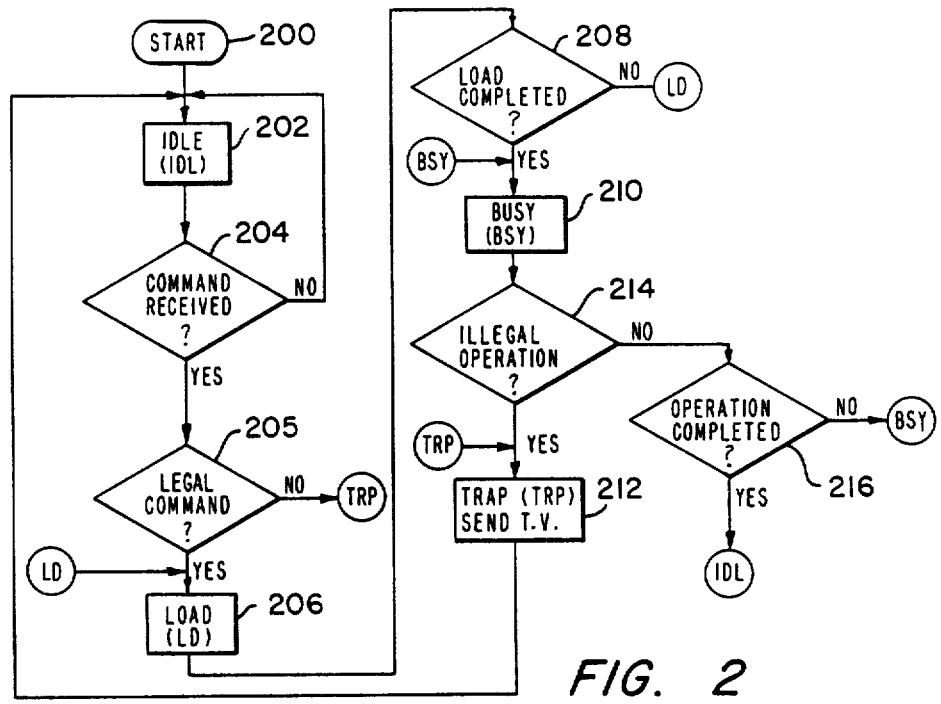
FIG. 2 is an operational sequence state diagram of the processor of the present invention.

As shown in FIG. 2, the CIP enters block 200 and remains in the idle state (block 202) when not processing information, and must be in the idle state to accept a command (i.e., a CIP instruction or an I/O command) from the CPU. On receipt of a command (block 204), if legal (block 205), the CIP enters the load state (block 206) and remains in the load state until all associated command information is received. When this information is successfully received (block 208), the CIP enters the busy state (block 210) to process the information. Any further attempts by the CPU to communicate with the CIP while in its busy state are not acknowledged by the CIP until it returns to the idle state again. CIP processing includes the communication activity with main memory that occurs when fetching the necessary operand(s). The CIP enters the trap state (block 212) only when specific illegal events occur (block 214), such as detection of an illegal operand length or an out of sequence command. Return is made to the idle state if the operation has been completed (block 216).

All pertinent instruction transfers to the CIP are performed jointly by the CPU and CIP. They are decoded and sent by the CPU to the CIP along with all of the pertinent information required for execution of the instruction. When the transfer of the information is completed, the CPU and CIP continue to process their respective instructions. Each CIP instruction contains a 16-bit wide instruction word that is immediately followed with up to six additional descriptive type words (also 16-bits wide), called data descriptors and labels. The instruction word contains the CIP op-code that is sent to the CIP for processing. The data-descriptors describe the operand type, size, and location in memory; the label provides the address of a remote data descriptor. Both the data descriptor and the label are processed by the CPU; related information derived by this action, such as an operand type and memory address, is sent to the CIP for processing. The CPU accomplishes the preceding by analyzing the op-code that is contained in each instruction. When the CPU detects a CIP instruction (i.e., if the CIP is in the idle state), the CPU sends the instruction op-code and the related information in the following manner: (i) The CPU sends the op-code (i.e., the first word of the commercial instruction) to the CIP. The CIP enters the load state when it accepts the op-code; (ii) The CPU fetches the first data descriptor and interrogates the address syllable to generate the effective address; (iii) The CPU sends the following information: the 24-bit effective byte address of the first operand, the contents of the pertinent CPU data register, if applicable, and the data descriptor of the first operand, updated to reflect a byte (eight bits) or half-byte (four bits) digit position within a word; and as second and third operand are encountered, the CPU performs the applicable procedures in steps ii and iii.

At this point, the CIP is loaded with all of the necessary information required to execute the commercial instruction and enters the busy state to execute the instruction. When necessary, the CIP communicates directly with main memory to obtain the applicable operand(s). However, it should be noted that the CIP never directly accesses any CPU registers. It only uses information sent to it by the CPU. Hence, no CPU registers are modified by the CIP and the CPU continues to process the next and each succeeding CPU instruction until one of the following conditions occurrs: (i) The CIP, via a trap vector (TV), notifies the CPU that an illegal event occurred during the execution of the current commercial instruction; or (ii) an internal or external interrupt signal is detected by the CPU.

When an interrupt signal is detected by the CPU, the CPU performs the following. The CPU determines whether or not the last commercial instruction was completed by the CIP. The CPU waits for completion of the last commercial instruction. When the last commercial instruction is completed, the CPU determines if it resulted in a trap request. If it did, the CPU honors the trap request before performing the interrupt. This results in a typical context save/restore operation to store all relevant CPU and CIP status information, as required. With the completion of the CPU operations required to process a CIP trap request, or when there is no trap request and a CIP instruction is available for processing, the CPU performs the following. The CPU updates its program counter to point to the commercial instruction it was attempting to initiate. The CPU defers the attempt to process the commercial instruction until the current interrupt is serviced. The CPU honors and services the interrupt caused by the external device.

As the CIP executes an instruction, all CPU registers, including those referenced by the current commercial instruction, can be altered by a program via CPU instructions. However, the software must not modify the operand for a commercial instruction until the CIP is through processing that instruction; otherwise, unspecified results will occur. Branch instructions included in the CIP instruction repertoire are executed synchronously by the CPU and the CIP.

The three types of data that make up the data words processed by the CIP are Alphanumeric Data, Binary Data and Decimal Data. Each data type is classified into units of binary information. By definition this unit, when used to reference alphanumeric and binary data characters equals eight bits (one byte); when used to reference decimal data characters, it equals four bits (half byte) for packed decimal data and eight bits (one byte) for string decimal data. Also, single precision binary numbers consist of two units (two bytes) and double precision binary numbers consist of four units (four bytes).

Figure 3:
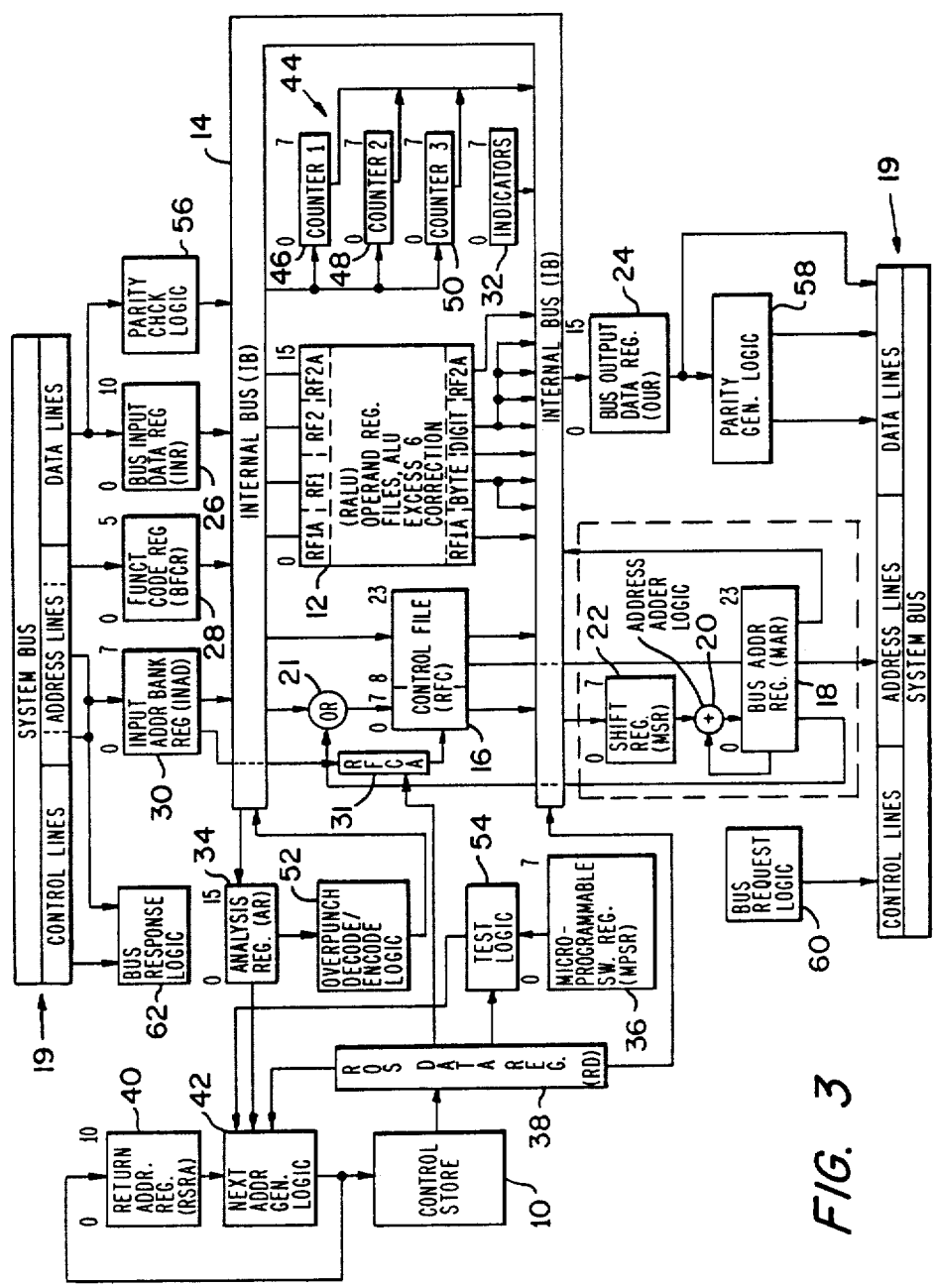
FIG. 3 is a block diagram of the processor of the present invention.

FIG. 3 is a major block diagram of the commercial instruction processor 13 of the present invention, showing all of the major data transfer paths between the processor's registers.

The control storage 10 is comprised of a plurality of locations, one for each control store or firmware word. These firmware words directly or indirectly control the processor sequences, data transfer paths, and bus operations.

The operand register files and arithmetic logic unit (RALU) 12 primarily includes two register files, an arithmetic logic unit (ALU) and the associated multiplexers and control registers. Included in the RALU 12 are the operand register files (RF1 and RF2), each containing sixteen sixteen bit locations that are used to buffer operands for execution in the ALU. The ALU input multiplexers and latches are comprised of the following: three 2-to-1 multiplexers (zone selection), two 4-to-1 multiplexers (digit selection), and two 8-bit latches (byte latches). These multiplexers and latches are used to deliver data from the operand register files to the ALU. Data can also be transferred from the current product counter to the left side of the ALU or from operand register file 2 to the multiply register. The 8-bit ALU (which is comprised of two 4-bit ALU chips, a carry look-ahead chip, and a carry in/carry out flip-flop) is capable of performing the following operations between the left (1) and right (2) inputs: Binary Add, Binary Subtract Input 1 from Input 2, Binary Subtract Input 2 from Input 1, Logical OR, Logical AND, Exclusive OR, Set ALU Output Equal to FF, and Clear ALU Output to 00. The RALU is discussed in detail with respect to FIG. 5.

The excess 6 (XS6) correction logic of the RALU is enabled whenever the ALU is in decimal mode, and is used to change the binary output from the adder to the correct decimal digit while modifying the carry output for subsequent operations. XS6 correction is accomplished by using a 32-bit by 8-bit PROM chip, which encodes the corrected three high-order bits of the digit and generates the corrected carry. A digit less than two function is also available on the output of the PROM chip for other controls. The ALU output multiplexer is used to feed either the upper four bits of the adder output or the correct decimal zone bits to the internal bus 14, depending on whether the ALU is operating in binary or decimal mode, respectively. The RALU control logic consists of three registers, which are as follows: RF1A—Register File 1 Address Register, RF2A—Register File 2 Address Register and ALMR—ALU Mode Control Register. Three registers, in conjunction with several microinstructions, control all operations within the RALU. Besides the registers and control described previously, there are two other registers that are classified as RALU registers. These registers are the current product counter (CPRC) and the multiplier register (MIER), to be discussed hereinafter.

The control file 16, also referred to as register file C (RFC), is a 16 location by 24 bit RAM that is primarily used to store all instruction related information that originates from the CPU 11 (e.g., task words, data descriptors, effective addresses, etc.). The control file also contains several word locations which are used by the processor (CIP) firmware. The control file 16 receives bits 0–7 from either internal bus 14 or bus address register (MAR) 18 via OR logic multiplexer 21. The bus address register (MAR) 18 and address adder logic 20 shall now be discussed. The MAR register 18 is a 24-bit address register that is primarily used to address the system bus 19. It is comprised of an 8-bit two-input multiplexer register on the low end and a 16-bit incrementor/decrementor on the high end. The multiplexed input into the lower eight bits is from either the control file 16 or the output of the address adder 20. The address adder 20 is an 8-bit two's complement adder unit that is primarily used for incrementing or decrementing the contents of the bus address register 18. The inputs to the address adder 20 are the low-order eight bits of the bus address register and the 8-bit shift register (MSR) 22. The shift register (MSR) 22 is an 8-bit universal shift register that can be loaded from the internal bus 14 and is capable of shifting left or right by one bit (i.e., open-end shift with zero-fill). The shift register functions as an input to the address adder 20 for incrementing or decrementing the bus address register 18. In addition, bit 0 of the shift register 22 can be loaded into the ALU carry-in flip-flop, which is useful during execution of the conversion instructions.

The bus output data register (OUR) 24 is a 16-bit data register that is used to transfer data onto the bus 19 data lines. It is loaded from the internal bus 14 with either the lower or upper bute or the entire 16-bit word. The bus input data register (INR) 26 is a 16-bit data register that is used to receive data from the bus 19 data lines. The contents of the input data register can be unloaded onto the internal bus 14.

The input function code register (BFCR) 28 is a 6-bit register that is used to store the function code when the CIP accepts any bus 19 input or output command. Subsequently, firmware examines the contents of the function code register 28 and executes the specified command. The input address bank register (INAD) 30 is an 8-bit register that is used to store the high-order eight memory address bits that are received over the bus 19 address lines. The high-order eight address bits contain the memory module address and are transmitted by the CPU 11 as the result of a so-called IOLD command or an output effective address function code. The low-order 16-bits of the memory address are received over the bus 19 data lines and are strobed into the INR register 26, forming the required 24-bit main memory address.

Figure 4:
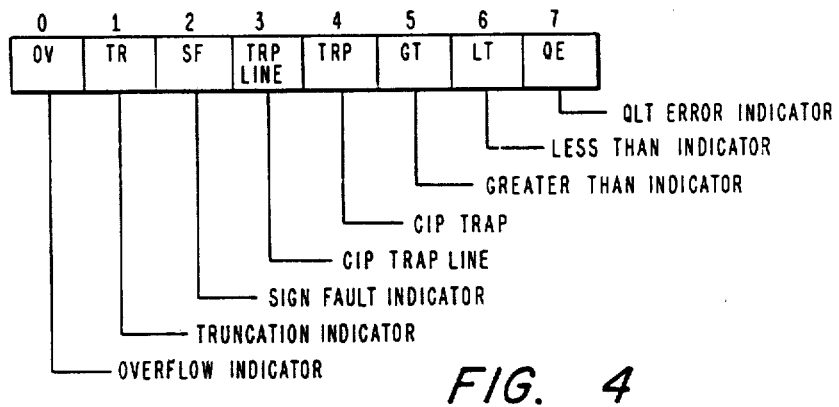
FIG. 4 illustrates the contents of one of the registers of the processor of the present invention.

The CIP indicator register 32 is an 8-bit storage register in which each bit can be individually set or reset. The indicator register bit configuration is shown in FIG. 4. The TRP and TRP line indicators are used by the CIP 13 for internal processing only and are not software visible. The TRP line (CIP trap line) indicator is used to inform the CPU 11 of an existing CIP trap condition and is transmitted over the bus 19 via the external trap signal. When set, the TRP (CIP trap) indicator allows the CIP to accept only input commands from the CPU.

The analysis register (AR) 34 is a 16-bit register that is primarily used to control microprogram branches (masked branches) and the over-punch byte encode/decode logic. This register is loaded with the entire 16-bit word from the internal bus 14. The microprogrammable switch register (MPSR) 36 is an 8-bit register in which each bit can be individually set or reset under microprogram control. Each bit within the MPSR register 36 is used as a flag to facilitate microprogramming (i.e., firmware can test each of the register bits and perform branch operations, depending on the test results). Some of these bits are also used to control certain CIP 13 hardware functions.

The ROS data register (RD) 38 is a 52-bit storage register that is used to store the control store output (firmware word) for the current firmware cycle. The microprogram return address register (RSRA) 40 is an 11-bit register that is loaded from the output of the next address generation (NAG) logic 42 and is used to store the microprogram return address when executing a firmware subroutine. The register file C address multiplexer/selector (RFCA) 31 is a 4-bit, 2-to-1 selector that is capable of addressing one of the 16 locations contained within register file C (i.e., control file) 16. This selector 31 selects a combination of the function code register 28 and either counter (1) 46 or selected bits of the ROS data register 38. The CIP counters 44 include three 8-bit up/down counters 46, 48 and 50 that are defined respectively as Counter 1 (CTR1), Counter 2 (CTR2), and Counter 3 (CTR3). These counters are loaded/unloaded via the internal bus 14. The contents of each counter are available for test and branch operations.

The overpunch byte decode/encode logic 52 includes two 512-location by 4-bit PROM chips that are used to decode/encode the contents of the analysis register (AR) 34. The byte being decode is obtained from AR bits 1 through 7 and the digit begin encoded is obtained from AR bits 4 through 7. The decode/encode operation is accomplished by using AR bits 1 through 7 to address a specific PROM location. The contents of the specified PROM location are coded to conform to either: (1) the decoded digit, its sign, and its validity, or (2) the encoded overpunched byte. The MPSR 36-bit 4 specifies whether a decode or encode operation is performed, while MPSR bit 1 indicates the sign of the digit being encoded. Also, the output of the overpunched byte decode/encode logic is available on both halves of the internal bus 14.

The CIP test logic 54 selects one of 32 possible firmware test conditions for input to the next address generation logic 42. The true or false condition of the function being tested controls bit 50 of the control store next address field (i.e., sets or resets bit 50, depending on the condition of the tested function). The next address generation (NAG) logic 42 included in the CIP 13 uses one of the following five methods to generate the next firmware address: direct address, test and branch, masked branch, major branch, or subroutine return. Direct Address: this method is used when an unconditional branch is performed to the next sequential control store location. This is accomplished by using bits 41 through 51 of the control store word to form the next address. These bits comprise the next address (NA) field, which can directly address any of the available control store locations. Test and Branch: this method is used when a 2-way conditional branch (test condition satisfied) is performed within a firmware page (a firm-ware page being a 128-location segment within the control store). This is accomplished by using control store bits 41, 42, 43, 44 and 50 to select a test condition. Then, depending on the condition of the tested function, a branch is performed to one of two locaions. The branch operation performed under this method is modulo 2 (i.e., the two possible branch addresses are two locations apart). The modulo 2 address is developed as follows: (1) if the test condition is satisfied, bit 9 of the address is set to a one, or (2) if the test condition is not satisfied, bit 9 of the address is set to a zero. Masked Branch: this method is normally used when branching on the contents of the analysis register (AR) 34 or certain other conditions, and provides branching to 2, 4, 8 or 16 locations within the same firmware page (a firmware page being a 128-location segment within the control store). Major Branch: this method is used when branching within a firmware page (128 words). A CPU/CIP interface routine uses this method to perform the required 16-way branch on the contents of the function code register 28. (INB Major Branch) and other control functions (EOP Major Branch). Subroutine Return: this method is used to return the firmware to the next odd or even control store location after execution of a firmware subroutine. The return address is obtained from the return address (RSRA) register 40, and must be stored in this register 40 prior to execution of the specified subroutine.

The internal bus 14 is 16-bits wide and is primarily used to transfer data between CIP registers, including locations within the register files. The internal bus receives data from several sources as shown in FIG. 2. Outputs from the internal bus 14 are fed to various registers within the CIP.

The parity checking logic 56 is coupled between the bus 19 and internal bus 14 and is used to check the parity of the incoming data. The parity generator logic 58, on the other hand, is used to generate the correct parity bit for transfer over the bus 19.

The bus request logic 60 and the bus response logic 62 are utilized for the purpose of enabling the CIP to gain access to the bus 19 and to respond to any requests to gain access to the CIP. Logic 60 and 62 are described in U.S. Pat. No. 3,993,981.

Figure 5:
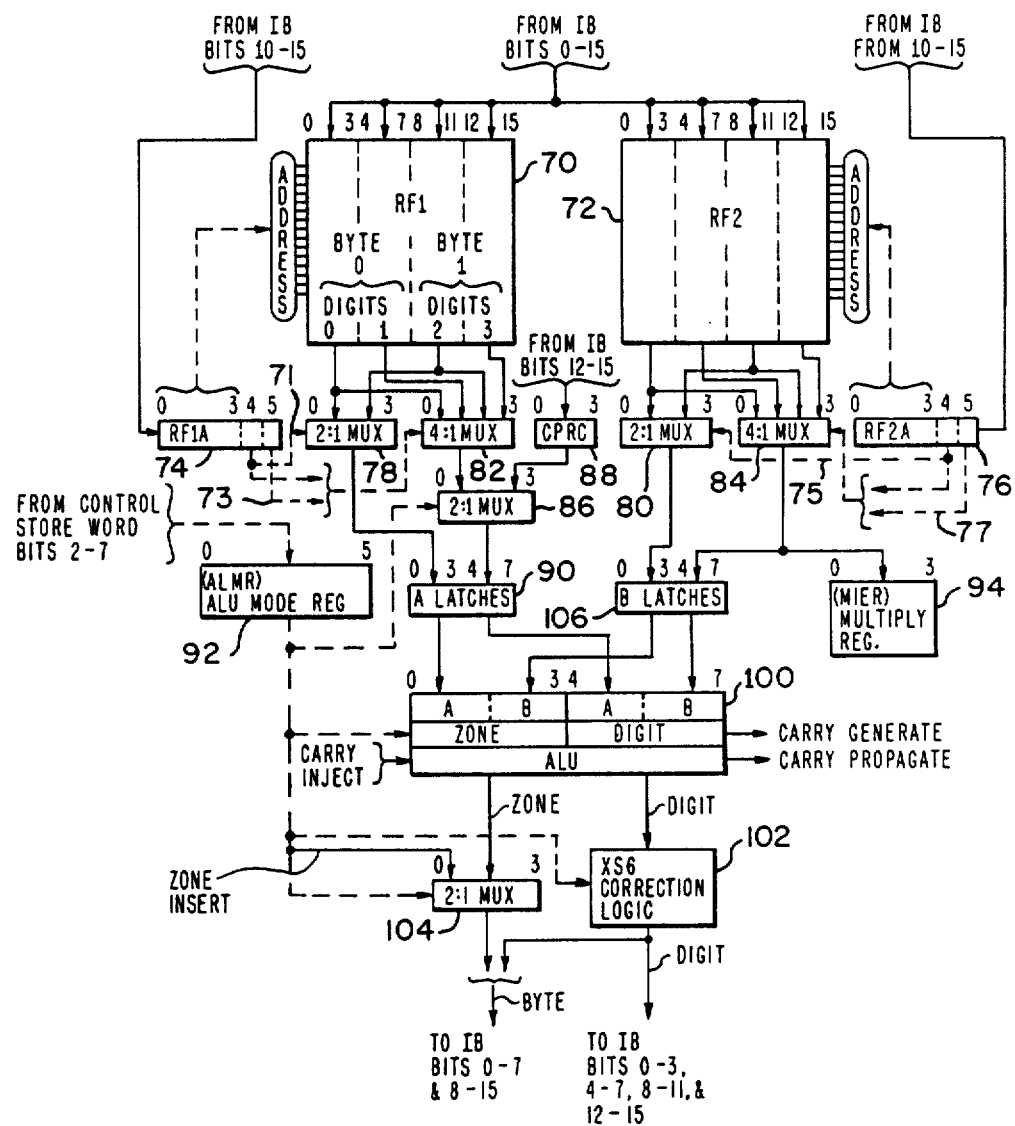
FIG. 5 is a detailed block diagram of the arithmetic unit of the present invention.

FIG. 5 is a major block diagram of the RALU 12, showing all major data transfer paths and control lines. The control lines are shown as dashed lines for ease of understanding its operation. For convenience, the description of the RALU is divided into seven areas: Operand Register Files, ALU Input Multiplexers and Latches, Arithmetic Logic Unit, XS6 Correction Logic, ALU Output Multiplexer, RALU Control Logic, and Miscellaneous RALU Registers. Operand register files RF1 70 and RF2 72 each consist of four RAM chips that are used as temporary storage for CIP operands. Addresses for each of the register files are supplied by two 6-bit address registers (RF1A 74 and RF2A 76, respectively). Bits 0 through 3 of each address register supply the address of the location within the associated register file, while the low order bits provide for byte and digit selection at the output of the register file. Both of these address registers can be incremented or decremented by 1, 2 or 4 (i.e., by digits, bytes, or words). As shown in FIG. 5, the output from each register file is fed to the inputs of two multiplexers (i.e., a pair of multiplexers for each register file) that select between zone and digit information. The selection is accomplished by bits 4 and 5 of the associated address register. Bit 4 selects whether bits 0 through 3 or 8 through 11 (from the register file) are fed to the output of the 2-to-1 multiplexers 78 or 80 respectively, while bit 5 selects the register file bits that comprise the digit being fed to the output of the 4-to-1 multiplexers 82 or 84 respectively.

The various registers and multiplexers are coupled for control by various control lines, shown as dotted lines, and including, for example, control lines 71, 73, 75 and 77. A third 2-to-1 multiplexer 86 is used to select whether the contents of the current product counter (CPRC) 88 or the digit from RF1 is delivered to the A latches 90. This multiplexer is controlled by the ALMR register 92. The ALU input latches, A latches 90 and B latches 106, receive both zone and digit information from the ALU input multiplexers, and latch the data into the register files during write operations. The outputs from the latch circuits feed the zone and digit information to the left and right sides of the ALU, respectively.

The current product counter (CPRC) is a 4-bit decimal up/down counter that is primarily used during execution of decimal multiply and divide operations. The multiplier register (MIER) 94 is a 4-bit binary up/down counter that is primarily used during decimal multiply and divide operations. The ALU mode control register (ALMR) 92 is a 6-bit control register that is used to control all ALU operations. The register file 1 address register (RF1A) 74 is a 6-bit address register that performs two functions: (1) provides addresses for register file 1 (70), and (2) controls two of the three ALU input multiplexers associated with register file 1. The register file 2 address register (RF2A) 76 is a 6-bit address register that performs two functions: (1) provides addresses for register file 2 (72), and (2) controls the ALU input multiplexers associated with register file 2. All arithmetic logic unit (ALU) 100 operations are performed in either the decimal or binary mode. Decimal mode is used when operating with decimal digit information, while binary mode is used for byte (Alpha) operations. Both modes of operation also control the excess 6 (XS6) correction logic 102 and the inputs to the carry flip-flop. In decimal mode, the carry flip-flop is loaded with the carry from the low-order four bits of the ALU, while in binary mode, it is loaded with the carry from the eight bits of the ALU for subsequent arithmetic operations. The carry flip-flop is loaded under microprogram control when a carry must be propagated for subsequent operations. In addition, the carry flip-flop can be loaded from the MSR register, and set or reset under microprogram control.

The XS6 correction logic 102 has one 32-bit by 8-bit PROM chip and the associated control logic to correct the high-order three bits from the digit output of the ALU. XS6 correction is performed if: (1) the ALU is in decimal add mode and a decimal carry is encountered or the digit output of the ALU 100 is greater than 9, and (2) in the decimal subtract mode, if a borrow is encountered (i.e., absence of a carry from the digit portion of the adder). The PROM chip has five address lines. Three of these lines consist of the three high-order bits from the digit output of the ALU, while the other two address lines indicate the type of operation being performed (i.e., add correction, subtract correction, or no correction). The coded contents of the PROM chip are the three high-order corrected bits of the digit, the corrected decimal carry, and the digit less than 2 condition.

The ALU output multiplexer 104 selects between the upper four bits of the adder output and the corrected decimal zone bits for delivery to the internal bus. The configuration of the zone bits (for decimal mode) depends on whether ASCII or EBCDIC data is being used (i.e., if ASCII data is being used, the zone bits are forced to a value of 3; if EBCDIC data is being used, the zone bits are forced to a value of F).

The RALU controls consist of registers RF1A 74, RF2A 76, and ALMR 92 plus various RALU related microinstructions. In addition, the ALU carry flip-flop is under microprogram control. The carry flip-flop can be precleared or preset, (as required), by the respective microinstructions, and can be loaded from: (1) the 4-bit digit carry for decimal operations, (2) the 8-bit binary carry for binary operations, or (3) bit 0 of the MSR register 22 during execution of conversion instructions. The ALMR register 92, which controls all ALU operations, is loaded from control store bits 2 through 7. Bit 0 specifies whether the ALU operates in decimal or binary mode; i.e., whether the carry out of the ALU is from bit 4 (digit carry) or bit 0 (binary carry). Bit 0 also controls both the ALU correction (XS6) for decimal operations and the ALU output multiplexer 104; the multiplexer determines whether the high-order four bits of the ALU or the forced zone bits are gated to the internal bus. Bits 1, 2 and 3 are used to control operations within the ALU. Bit 4 specifies whether the zone bits are forced to a value of 3 or F (i.e., for ASCII data, the zone bits are forced to a value of 3; for EDCDIC data, the zone bits are forced to a value of F). Bit 5 specifies whether the selected digit from register file 1 or the contents of the current product counter 88 are gated to the latches 90 associated with the left side of the ALU. Register RF1A provides the address and controls for register file 1 and the associated ALU input multiplexers. Register RF2A provides the addresses and controls for register file 2 and the associated ALU input multiplexers.

The control file 16 is divided into two sections: the upper section (bits 0 through 7) and the lower section (bits 8 through 23). Each section of the control file can be loaded as follows: RFC lower from the internal bus (bits 0 through 15), RFC upper from the internal bus (bits 0 through 7), RFC lower from the internal bus (bits 0 through 15), and RFC upper from the bus address register 18 (bits 0 through 7). The functions used to implement the above operations have an address associated with them, which address corresponds to the RFC 16 location being loaded. This address originates from either the function code register 28 or the control store 10. Thus, the RFC address is directly related to the type of data being delivered by the CPU 11, or as indicated by the function code.

Figure 6:
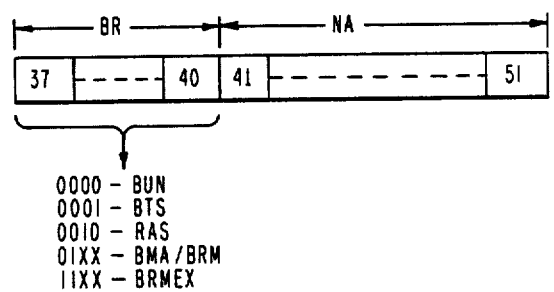
FIG. 6 is depicts a portion of the contents of the control store word used in conjunction with the present invention.

The CIP firmware word is divided into 14 distinct fields. Although several of the fields occur in identical bit positions within the firmware word format, their functions differ according to the particular operation being performed during the current firmware cycle. The 14 fields used for the CIP firmware word are: (1) RALU, (2) BI, (3) BE, (4) MSC1, (5) CTRS, (6) CIIR, (7) CONST, (8) MAR/MSR, (9) RFCAD, (10) RFCWRT, (11) MISC2, (12) MPSR, (13) BR, and (14) NA. Only fields BR and NA, shown in FIG. 6, are pertinent to the next address generation logic of the present invention.

The branch type (BR) field includes bits 37 through 40 of the firmware word. This field determines the type of branch performed as the result of a specific test condition. The next address (NA) field includes bits 41 through 51 of the firmware word. This field is used to either: (1) provide a direct address for the next firmware location, or (2) specify the test condition used during generation of the next firmware address, along with its relative address.

The next ROS address is generated as a function of the BR and NA fields of the control store word. A decode of these fields provides the following six microinstructions (plus associated arguments) that perform the actual generation of the next address: BUN: Branch Unconditionally, BTS: Branch on Test Condition, BMA: Major Branch, RAS: Return After Subroutine, BRM: Masked Branch, and BRMEX: Masked Branch Extended.

The next address generation (NAG) logic 42 is shown in detail in FIGS. 7A through 7F and includes multiplexers, PROM chips, registers, and associated logic that, in conjunction with the following ROS Data (RD) register fields, generate a control store (ROS) address. Such data register fields include the (1) branch field (RD37BR through RD40BR), and (2) the next address field (RD41NA through RD51NA). These data register fields derive their specific functions from the firmware word. The multiplexers along with the predetermined registers: (1) select address data from one of the sources listed as follows, (2) form this data into an 11-bit next address (NEXA00 through NEXA10) field, and (3) route this field to control store (ROS) 10 for selection of a specific control store word. The sources from which address data is selected are as follows: (1) analysis register (AR) 34; (2) extended mask branch register 700 with its following inputs: (a) microprogram switch register (MPSR) 36, (b) op-code register (CIOPR) 704, (c) counter 1 and counter 2 decode (CTR1 46 and CTR2 48), (d) counter 3 (CTR3) 50, and (e) two sign status indicators (NEGSNF and ILLSNF) or indicator register 32; (3) end operation branch PROM (EOPMB) 706; (4) initial major branch PROM (BINMB) 708; (5) ROS return address register (RSRA) 40; (6) ROS address field (NEXA) 710; (7) ROS page register (RSRGR) 730; and (8) ROS data register (RD) 38. The precise manner in which the NAG logic generates an address is described hereinafter. The following provides a functional description of the registers and PROMs that are directly associated with the NAG logic. The analysis register (AR) 34 is a 16-bit register that is primarily used with a masked branch (BRM) instruction to provide the necessary microprogram branches within the control store (ROS) 10. The AR register is also used to implement the overpunch byte decode/encode operation. Data from the internal bus (BI) is available to the AR register with the execution of a BARFBI microinstruction (i.e., load AR from BI). Data from the AR register 34 (or the extended mask branch register 700) is selected and gated onto the AR test condition (AR00TC through AR15TC) field by RD register 38 bit (RD37BR).

The extended mask branch register 700 is a 16-bit register. It is used exclusively with the extended mask branch (BRMEX) instruction to transpose pertinent commercial instruction processor (CIP) functional data from selected registers and counters to the AR register 34 output test condition (AR00TC through AR15TC) field for control store address modification or generation. The selected registers and counters are as follows: (1) microprogram switch register 36: This register provides the applicable microprogram control flags (MPSR00 through MPSR03) for firmware interrogation, (2) op-code register 704: This register retains the applicable CIP instruction word op-code (CIOPR0 through CIOPR5) field, (3) counter 1 46 and counter 2 48 decode: These counters provide test conditions for specific microprogram test and branch conditions, (4) counter 3 50 (bits 6 and 7): counter 3 (bits 6 and 7) provide for offset checkout, and (5) sign conditions: The sign conditions provide the negative sign (NEGSNF) and the illegal sign (ILLSNF) codes.

When a major branch (BMA) or a masked branch (BRM) instruction is executed, control signal RD37BR is false. This disables the transfer of the preceding functions (items 1 through 5) into the extended mask branch register and enables the output from the AR register. Subsequently, the decode of an extended mask branch (BRMEX) instruction makes signal RD37BR true, disables the output from the AR register, and enables the output from the extended mask branch register.

The microprogram switch register 36 (MPSR) is an 8-bit register that uses each bit individually or groups of bits collectively as flags for microprogramming or for firmware test and branch operations. The output from the MPSR is distributed to the extended mask branch register and the binary collector multiplexers 712 to modify or generate a control store address. In addition, selected outputs from the MPSR 36 are distributed to the following CIP logic elements to perform the indicated functions: (1) overpunch decode/encode logic 52; where (a) MPSR01 defines the operand sign (zero=-positive (+) sign; one=negative (−) sign) and (b) MPSR04 defines the type of decode/encode operation (zero=decode operation; one=encode operation); (2) data status accumulator: MPSR05 forms the address to status accumulator PROM; and (3) RALU: MPSR07 is used for the multiplexer 10's complement PROM during MIER loading.

Data sent into the MPSR 36 is obtained from and controlled by the ROS data (RD) register 38 miscellaneous control (RD32MS through RD36MS) field. Signal RD32MS provides the firmware data for the MPSR input lines. It is made available to the respective MPSR output line by a 3-bit binary code on the select (SEL) input lines to the register. This 3-bit binary code is provided by firmware via RD miscellaneous control (RD33MS through RD35MS) signals. The actual data transferred to the selected output line occurs when signal RD36MS is true and with the negative transition of MPSREN- on the clock (C) input line to the register.

The op-code register 704 is a 6-bit register (CIOPR0 through CIOPR5) that holds an op-code from a CIP instruction word for ultimate address modification of a control store address. This op-code resides in the hexadecimal code field (bits 10 through 15) of the instruction word. The op-code register monitors internal bus bits BI10 through BI15 for this field. When the op-code register receives this field, it is sent to the extended mask branch register 700 and to the end operation PROM 706 where it is used in the generation of the next address (NEXA) field. Internal bus data is strobed into the op-code register 704 on the positive transition of its clock (C) input line via signal LCIOPR. This signal is generated by decoding the output of the RD register 38 when: (1) the decoder input address field (RD17KT through RD19KT) equals a binary 8, (2) an RD register to BI load operation is not in progress (i.e., the unload (ULKNST) signal is low), and (3) with the positive transition of the next clock 1 pulse.

Three 8-bit counter configurations called counter 1 (CTR1) 46, counter 2 (CTR2) 48, and counter 3 (CTR3) 50 provide the NAG logic with the following four test conditions that are used for specific test and branch operations described hereinafter: less than 8 (CTR3L8), less than 4 (CTR1L4), CTR2L4, and CTR3L4, less than 2 (CTR1L2, CTR2L2, and CTR3L2, and equal to 0 (CTR1E0, CTR2E0, and CTR3E0). The basic configuration for each of the three counters is the same. Hence, the following counter description is confined to CTR1 46.

Internal bus bits 00 through 07 provide source data for each counter configuration. The least significant five data bits of byte 0 of BI (BIDT03 through BIDT07) or all eight BI data bits of byte 0 (BIDT00 through BIDT07) can be loaded into the counter at any one time as determined by the firm-ware. The firmware selects the 5-bit or 8-bit load via the RD register constant (KT) field bits RD16KT through RD23KT. The counter is incremented or decremented by a negative-going pulse on its respective count-up or count-down input line while the opposite line is held high. Data from counter 1 is used to decode one of the preceding test conditions from its associated PROM. The selected information is then distributed to the extended mask branch register 700 and the binary test collector multiplexers 712 where it is used to form the next address (NEXA) field.

The ROS return address register (RSRA) 40 is an 11-bit register that is used to store a microprogram return address. This return address is contained in the next address (NEXA00 through NEXA10) field to control store and, when stored in the RSRA register, can only be accessed by a return after subroutine (RAS) instruction. Data from the next address field is strobed into the RSRA register on the positive transition of its clock (C) input line via signal MISRAD.

The binary test logic 54 consists of four multiplexers and the associated gating logic, and is used exclusively with a branch on test (BTS) instruction. The logic selects one of 32 possible firmware test conditions and routes the selected test status (RSTSTT) signal to the next address generation logic 42 for use in the generation of a control store address. Actual test selection is performed by the most significant four bits of the RD register next address field, i.e., (RD41NA through RD44NA) and RD50NA. For example, to select the less than four status from CIP counter 2 (CTR2L4), the firmware encodes this NA field with a binary 3 (i.e., turns on RD43NA and RD44NA, and turns off RD41NA and RD42NA, and also turns on RD50NA). This transfers the test results from microprogram switch register bit 7 (MPSR07) and CTR2L4 to multiplexer output signal lines RSTST0 and RSTST1, respectively. RSTST0 and RSTST1 in turn activate the corresponding wired OR output signals RSTSTE and RSTSTD. RSTST2 and RSTST3 are disabled due to RD41 being off. RD41 is fed through an inverter 713 to the enable input of the multiplexers corresponding to RSTST2/3. However, with signal RD50NA true, further transmission of output signal RSTSTE is inhibited by the AND gate 717 since RD50NA is inverted by inverter 719 and the negation thereof is fed as one input of gate 717, while transmission of output signal RSTSTD is enabled by the AND gate 715 to activate signal RSTSTT to the next address generation logic. This enables signal RSTSTT to reflect the true or false state of CTR2L4.

A control store address is generated by using the next address generation (NAG) logic 42 in conjunction with the address lines to the control store (ROS). The NAG logic is designed to collect pertinent information from selected CIP sources, form this information into an 11-bit next address (NEXA00 through NEXA10) field, and route the field to the corresponding control store (ROS) address lines. Selecting and routing this information is initiated and controlled by the following six CIP branch instructions: Branch Unconditionally (BUN), Branch on Test Condition (BTS), Return After Subroutine (RAS), Major Branch (BMA), Masked Branch (BRM) and Extended Mask Branch (BRMEX). All branch instructions are encoded in the RD register branch (RD37BR through RD40BR) field. Note that because the RD register receives firmware information from the control store, it is also called the control store word. The manner in which each instruction and the NAG logic performs its assigned task to form a control store address is described as follows, it being noted that the term firmware page is defined as a 128-word segment within the control store.

An unconditional branch instruction (BUM) is used to address the next sequential location in the control store 10. The firmware forms this address in the RD register next address (NEXA) field. The RD register branch (RD37BR through RD40BR) field is set to zero for the BUN instruction. When the NAG logic decodes this instruction, the next address control (NEXAS0 and NEXAS1) signals and the RAS instruction control (NEXRAS) signal remain false. This places a zero at the select (SEL) input lines to the BUN multiplexers, which in conjunction with the associated gating logic, formulates and sends the above next address field to the control store. Also, with control signal NEXAS1 false, the most significant four bits from the next address (NEXA00 through NEXA03) field are strobed into the page select register 730 on the positive transition of its clock (C) input line via signal RSPGCK. The page select register provides the firmware page number in control store for subsequent use with a BTS, BRM, or BRMEX instruction.

A branch on test condition (BTS) instruction is used to perform a 2-way branch within a firmware page. It accomplishes this with bit 9 of the next address field (i.e., NEXA09). Bit 9 describes the true/false status of one of 32 possible test conditions selected by the binary test logic 54, and is used to modify a firmware-generated page address as it is formed in the next address (NEXA) field and sent to control store. The RD register BR field is set to a binary 1 (i.e., RD40BR is on) for the BTS instruction. The four most significant bits of the NEXA (RD41NA through RD44NA) field must contain a 4-bit binary value to select the desired test results. When the NAG logic decodes this instruction, NEXA control signal NEXAS1 goes true and the NEXA control signals NEXAS0 and NEXAS1 remain false. This sets a binary 1 at the select (SEL) input line to the BTS multiplexer, and enables the page select register and the associated gating logic to form and send the above next address field to the control store.

The return after subroutine (RAS) instruction is used to return to either the odd or even control store location, which corresponds to the address saved in the RSRA register, after the execution of a firmware subroutine. The return address is obtained from the return address register 40, and must be stored into this register prior to execution of the firmware subroutine. Execution of the RAS instruction transfers this address from the return address register (RSRA) to the NAG logic to form the next address (NEXA) field for a control store address. The RD register BR field is set to a binary 10 for the RAS instruction. When the NAG logic decodes this instruction, NEXA control signals NEXAS0 and NEXRAS are true. Control signal NEXAS0 sets a binary 2 on the select (SEL) input line of the RAS multiplexer for the six least significant bits from the RSRA register (i.e., RSRA05 through RSRA10). Control signal NEXRAS enables bit 4 (RSRA04) from the RSRA register through the NAG gating logic. The four most significant RSRA register bits (RSRA00 through RSRA03) are enabled with RD39BR true on the select (SEL) input line to a second RAS multiplexer. This action forms the NEXA format for a control store address.

The following description for the major branch (BMA), masked branch (BRM), and extended mask branch (BRMEX) instructions assumes that the analysis and page select registers contain the applicable address data required to form a next address (NA) field. The BMA, BRM and BRMEX instructions use the same NAG logic as the preceding (i.e., BUN, BTS and RAS) three instructions to generate and format their respective next address fields. The firmware selects and executes one of the three branch instructions by encoding both fields with the applicable code (instruction/data source). When the NAG logic decodes an instruction, it examines both fields (BR/NA) to determine the type of branch instruction and its data source; it then conditions the logic. For example, when the firmware initiates a BMA instruction, using the initial major branch PROM 708 for its primary data source, it encodes the RD register branch field with a binary 5 and sets the applicable bits in the NA field, outlined above, to zero. When the NAG logic decodes this instruction: (1) it encodes a binary 3 (NEXAS0/NEXAS1 true) on the BMA multiplexer select (SEL) input line for data from the initial major branch PROM, (2) it enables the output from the page select register (NEXAS1 true) and bit 45 (RD45NA) from the RD register (NEXRAS false), and (3) it selects (ENBMA) the initial major branch PROM via signal RD40BR+. This forms the next address field for a control store address as shown in the preceding BMA-NA instruction format illustration. Note that the initial branch PROM is selected through a major branch decoder 732, which is enabled when RD register bits 41 through 44 are set to zero as previously described.

The BRM and BRMEX masked branches are very similar in nature. The only difference between the two being that the BRM is based on the contents of the analysis register 34 of FIG. 7B, and the BRMEX branch, which is the extended mask branch, is based on the contents of the extended mask branch register 700 which has as its inputs some dedicated CIP control hardware. For both the BRM and BRMEX branches, RD38 of register 38 (RD38BR) has to be true, and for distinguishing between BRM and BRMEX bit RD37 is off for BRM and on for BRMEX. For ease of explanation, only the BRM branch will be explained here and the analogy will be made with the BRMEX and its associated hardware.

With RD38 true, the hardware decodes this branch instruction as a BRM. The BRM is based on the contents of the analysis register 34, which is a 16-bit register described previously. This register 34 can be interpreted as including four digits, digits 0, 1, 2 or 3, digit 0 being bits 0 to 3 and digit 3 being bits 12 to 15. While executing the BRM instruction, bits 39 and 40 of RDBR control the digit select of the analysis register. For example, if RD39 and RD40 were 0 and 1 respectively, then, digit 1, that is, bits 4 through 7 of the analysis register, would be selected for testing. Now that bits 4 through 7 have been selected for testing, as the name applies, a mask has to be provided for these bits to mask out the bits to be tested. By being able to mask these bits, the BRM has the capability of branching on a two-way branch, a four-way branch, an eight-way branch or an entire sixteen-way branch, if all four bits of that selected digit are being tested.

The mask which controls the bits to be tested in the analysis register is provided by RD41NA through RD44NA. Now, for example, if bits 4 and 5 of the analysis register 34 were to be tested, then bits RD39BR and 40 would be 0 to 1 respectively, and bits RD41NA and 42 would both be true, whereas bits 43 and 44 would be false, thereby giving a mask of 1100, a hexidecimal (hex) C, indicating that bits 4 and 5 of the analysis register are to be tested. This is accomplished via the multiplexers 734 and 736 of FIG. 7B. The multiplexer 734 has as its inputs the 16 bits AR00TC through AR15TC, which is basically a wired OR function of either the outputs of the analysis register 34 or the outputs of the extended mask branch register 700. On the select input of such multiplexer 734 are the bits RD39BR and RD40BR. Produced at the output of the multiplexer 734 are the selected four bits or selected digit of the analysis register controlled by RD39 and RD40.

The mask which is contained in RD41NA through 44 controls whether the bit selected from the digit of the analysis register or the corresponding bit from RDNA46 through 49 is to be taken to generate the NEXA for the next address. This selection by the mask of the corresponding bits in the analysis register is accomplished by the multiplexer 736 in FIG. 7B. As shown in such Figure, the selection is controlled by bits RD41 through 44 and the selection is between the output of the multiplexer 734 NEXAR0 through NEXAR3, or the corresponding bits from RD46NA through RD49NA. The corresponding bits of the NEXA field are selected such that if the mask bit is on, then the corresponding bit of the selected digit of the analysis register is taken to generate the NEXA field. If the corresponding bits of the mask in RD41NA through 44 are off, then the corresponding NEXA bit is taken from the field RD46NA through 49.

These four bits, which are the result of the BRM or BMA microinstructions, are used to generate the bits NEXA05 through NEXA08. Taking, for example, the generation of NEXA05, NEXA05 would be true if RD41NA is true and the selected bit of the digit, basically NEXAR0, is true. Or, if RD41NA is false, then the bit RD46NA would be selected to generate NEXA05. Thereby, this microinstruction BRM, as well as the BRMEX, have the capability of branching either on a two-way branch by testing only one bit, or to the other extreme, a sixteen-way branch by testing all four bits of the digit selected.

The extended mask branch is very similar to the BRM branch, except that instead of taking the output of the analysis register as the selected digit, it selects one of the groups of test conditions out of the extended mask branch register 700. The final output of the multiplexer 736, which is the result of the masked branch, NEXMK5 through NEXMK8, is wire ORed with the corresponding bits for the initial branch from the PROM 708 and the End Operation branch from PROM 706. The major branch BMA is also similar to the BRM and the BRMEX, except that it requires mask in RD41 through 44 to all zeros. The bits RD39 and 40 via decoder 732 select one of four possible branch PROMs of BMA conditions to generate the next address. In the case of the BMA, it is always an unconditional sixteen-way branch. Bits RD46NA through RD49NA are not used during the BMA operation, however, if further major branch conditions were necessary these bits could have been used to code more BMA conditions.

Figure 8A:
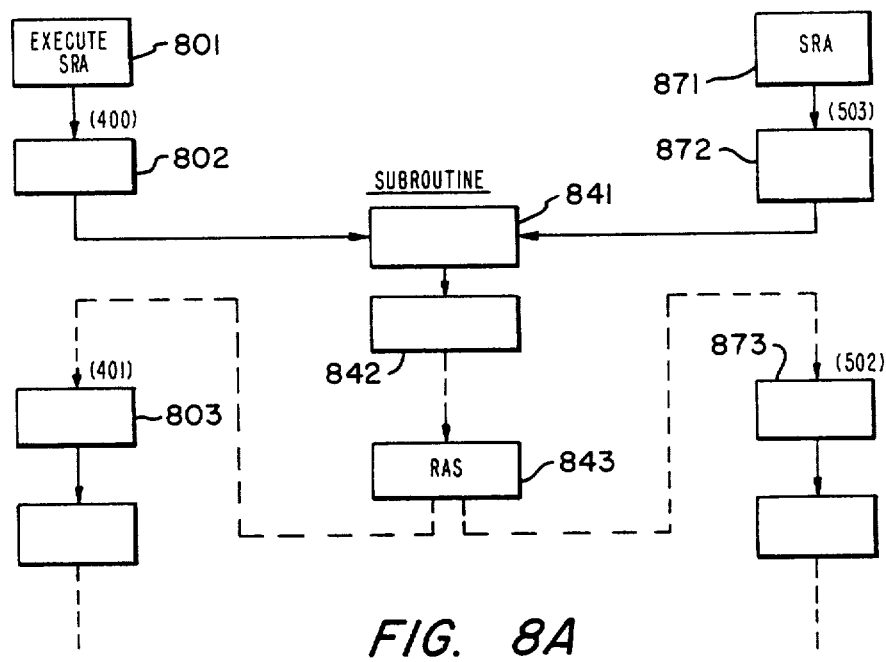
FIG. 8A and 8B illustrate the details of the subroutine logic of the present invention.
Figure 8B:
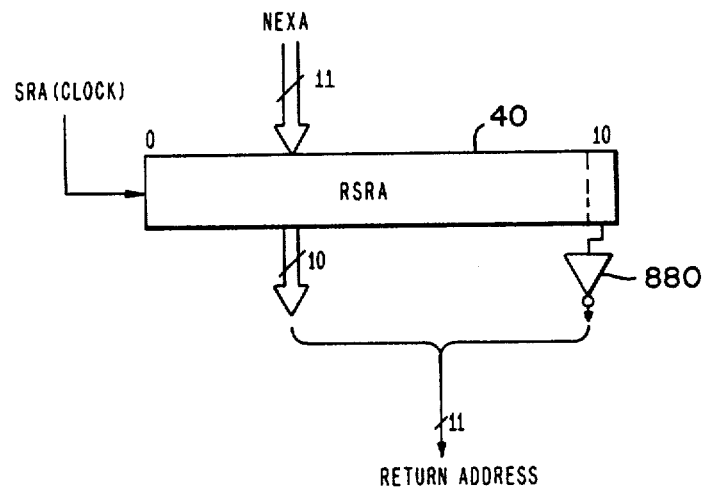

The subroutining mechanism of the CIP shall now be described. With reference to FIG. 8, the main line process starting in block 801 shares the subroutine in blocks 841, 842, etc., with the main line process starting in block 871. In order to share a subroutine between two or more main line firmware processes, a return address has to be stored before going to the subroutine. This firmware return address is stored in the register RSRA 40 under control of the microinstruction save return address (SRA) which is used to clock the register RSRA 40. At the execution of the SRA microinstructions the 11 bits of the next address are clocked into the register RSRA. For example, taking the flow starting in block 801, in block 801 the SRA microinstruction is executed. This microinstruction saves the address of the next sequential location is firmware, for example address 400, as shown for block 802. At block 802 an unconditional branch or a testing branch, whatever the case may be, is made to the subroutine of block 841. The subroutine is now executed, starting in block 841, and then 842, etc., until the end of the subroutine at block 843. A return after subroutine (RAS) microinstruction is then executed, as shown in the block 843. This microinstruction forces the NEXA to correspond to the contents of the RSRA register. While making the return, since address 400 is saved in the RSRA register, the low order bit of that address in RSRA is inverted via inverter 880, to correspond to the address 401. The NEXA address then corresponds to location 401 and the firmware returns to the location of block 803 which has the address 401. Thus, only the low order bit of the RSRA register is inverted to get to the corresponding return address point after the subroutine.

In the same analogy, the firmware routine starting in block 871 executes the SRA instruction and block 872, which has an address of 503, has such address 503 saved in the RSRA register. At block 872 an unconditional branch or a testing branch to the subroutine of block 841 is made. The subroutine is executed to its completion until block 843, where a return after subroutine (RAS) microinstruction is executed. This time the RSRA register contains address 503 and the low order bit, bit 10, of that register, being a binary 1 is inverted to a binary 0 to correspond to an address of 502. At the execution of RAS, the return address is now equal to 502 and the return is made to block 873 which has the address of 502.

Thus, irrespective of what the contents of RSRA were at the time the return is made, the low order bit of that RSRA is inverted to form the corresponding return address point for the RAS microinstruction. In such implementation, the low order bit is thereby used for a subroutining mechanism and gives two address pairs which are the exit from the entry to after the execution of the subroutine. If it is necessary to invert a different bit, the bit 8 or 9 or any other weight bit, so long as there is one bit inverted to make two corresponding locations for the subroutining mechanism inside the CIP. This mechanism eliminates the usage of an incrementer in the next address generation logic which is the conventional method of subroutining in firmware driven machines. For example, in a normal firmware machine, nominally the next address is incremented and this incremented value is saved in a return address register and this register is used to return to at the execution of the return after subroutine microinstruction. In the design of this invention, the need for such incrementer is completely eliminated and thus an incrementer is no longer necessary for firmware addressing. Only one bit needs to be inverted to make the subroutine mechanism operative.

This subroutining mechanism can also be expanded for the nesting of subroutines, if necessary. In order to make the nesting mechanism, there would be a file of RSRA registers. For example, if there are to be four levels of nesting subroutines, then there will be four such RSRA registers which could be inside a register file or a last in first out register microcircuit. Associated with this nested subroutine register file would be a pointer which would be incremented each time a save return address was made pointing to the last return address saved, so that when a subroutine return is made it will go back in the same sequence as it was saved.

The advantage of having the ROS page register 730 is that it provides four high order address bits for the next address of the firmware. If the ROS page register was eliminated, it would require that the firmware word be increased by four bits to provide the high order 4 bits of the next address. By the present invention, since the 4 bits of the next address are provided by the ROS page register, the corresponding 4 bits of the RDNA field, that is RDNA41 through RDNA44, can provide further control for the branch microinstructions. For example, in the BTS microinstruction, these bits are used to encode the condition which needs to be tested in this microinstruction, or in the case of the BRM and BRMEX microinstructions, these bits, bits RDNA41 through RDNA44, provide the 4 bit mask to control the bits of the analysis register to be tested.

The firmware page in the apparatus of the invention is 128 words which are basically derived from the low order 7 bits of the next address, which correspond to bits RDNA45 to RDNA51, which, in turn, correspond to NEXA04 to NEXA10. The firmware is divided into pages of 128 words, the philosophy of this 128 words per page is that in branches like the BTS, BRM, BRMEX and BMA, the high order 4 bits of the next address field are directly coupled from the 4 bits of the ROS page register. Since the next address field is 11 bits, that leaves 7 low order bits of the next address which are generated as a result of the address generation logic corresponding to these branch microinstructions. Since the high order 4 bits of the next address the constant during execution of these microinstructions and are from the ROS page register, it leaves only 7 bits to be manipulated for next address generation. Thus, the 7 bits correspond to the 128 words of address base which can be manipulated for these microinstructions. In the present apparatus, there are, by way of example, 16 such pages of 128 words (2 to the power of 7) thereby giving a total address base of 2048 words of fireware. The basic savings derived from using the ROS page register is that the control store does not need to be expanded to include the bits corresponding to the ROS page address and its next address field. If the depth of the control store is, for example, like in the CIP it would require two extra chips of PROM which are much more expensive than one chip of the ROS page register.

The BRMEX feature is an extension of the masked branch (BRM) microinstruction. Normally, the BRM microinstruction provides a capability of branching on more than one bit at the same time, which bits are selected from the contents of the analysis register. If the BRMEX capability did not exist, and it was necessary to test more than one logic function simultaneously in the firmware, it would require a load of these logic conditions into the analysis register from where they could be tested with the BRM microinstruction, and this would have to be done each time these logic conditions change and are tested. By providing the BRMEX capability, there exists the ability to test more than one function, up to four functions for example, simultaneously without having to load them into the analysis register. These logic functions are systematically arranged in such fashion that groups of four correspond to different digits of the analysis register. These groups of four conditions are selected on the basis of the design and their need to be in the same group. These hardware conditions which need to be tested simultaneously, similar to the test BRM, are available in the extended mask branch latch 700 of FIG. 7B. Actually, the latch (or register) 700, is actually a buffer, and more particularly a tri-state buffer, (i.e., it is free flowing and is basically used for isolating conditions from the rest of the hardware), which is enabled or disabled for selection of a BRMEX or a BRM microinstruction.

The selection between the BRMEX buffer 700 and the BRM analysis register 34 is controlled by bit RD37BR. The assertion goes directly to the analysis register enable line and the same bit RD37 is inverted through the inverter 739 and the output of that inverter is gated into the enable pin of the buffer BRMEX 700.

As discussed hereinbefore, the selection of the major branch or the analysis register branch BRM or BRMEX is under control of bits RDNA41 through 44. When these 4 bits are zero, the BMA microinstruction is enabled. This zero detection logic is block 731 of FIG. 7B. The decoder 732 is used to decode bits RD39 and RD40 which are encoded to select one of the four possible major branches. In the present apparatus, only two of the four possible branches are used, i.e., ENBMA0 and ENBMA1, which correspond to EOP major branch PROM 706 and the initial major branch PROM 708 respectively.

Figure 7A:
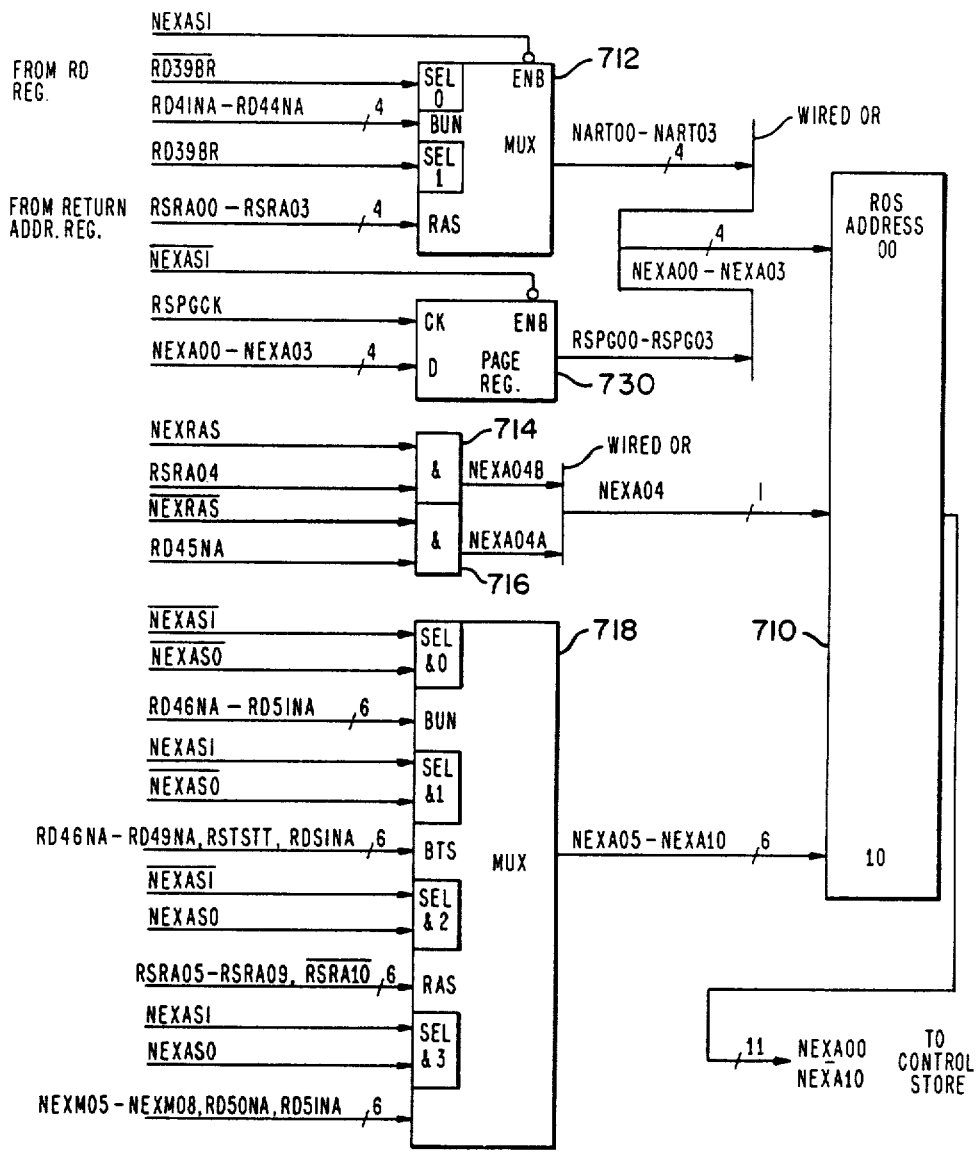
FIG. 7A through 7F illustrate the details of the next address generation logic of the present invention.
Figure 7B:
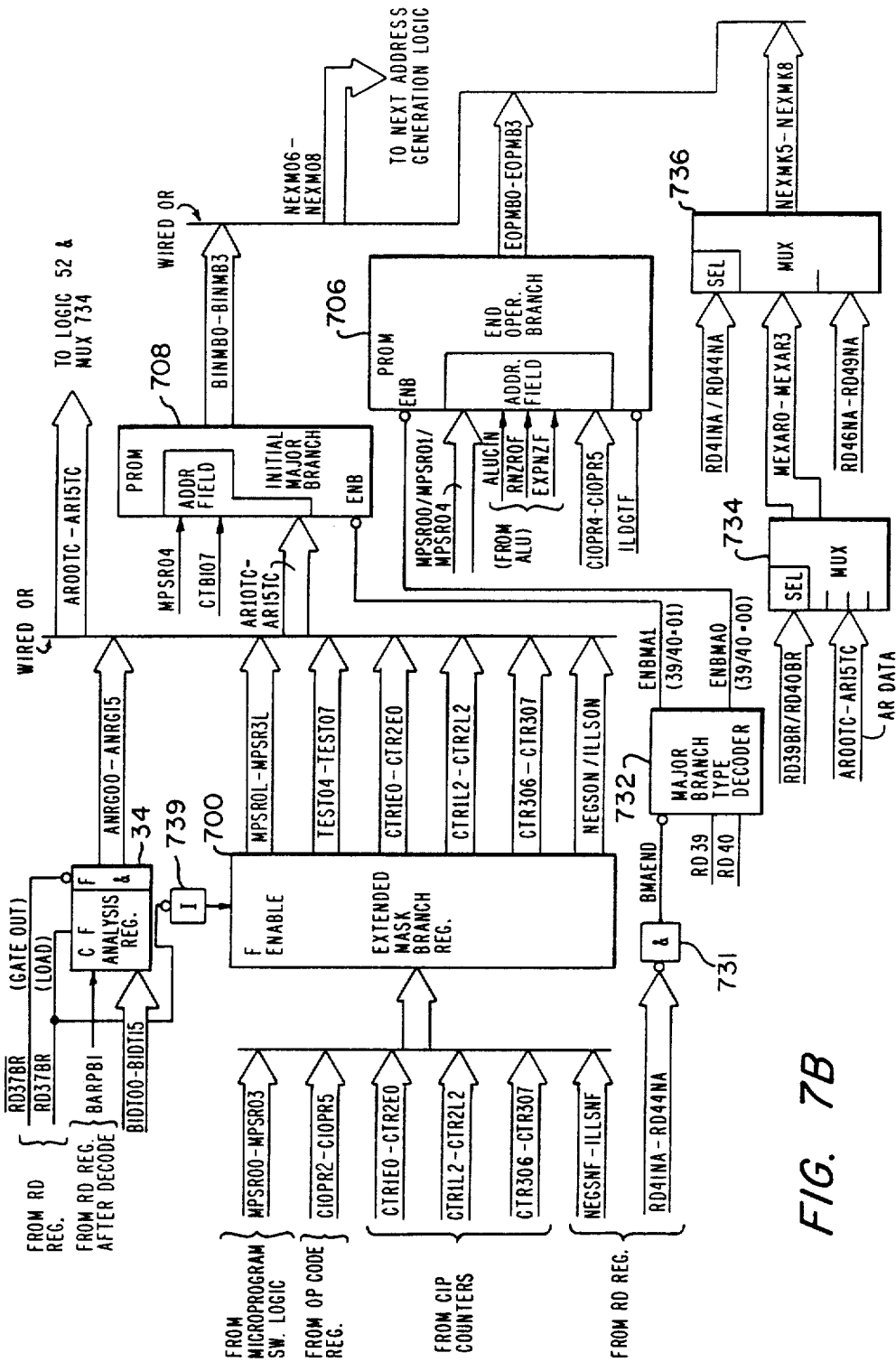
Figure 7C:
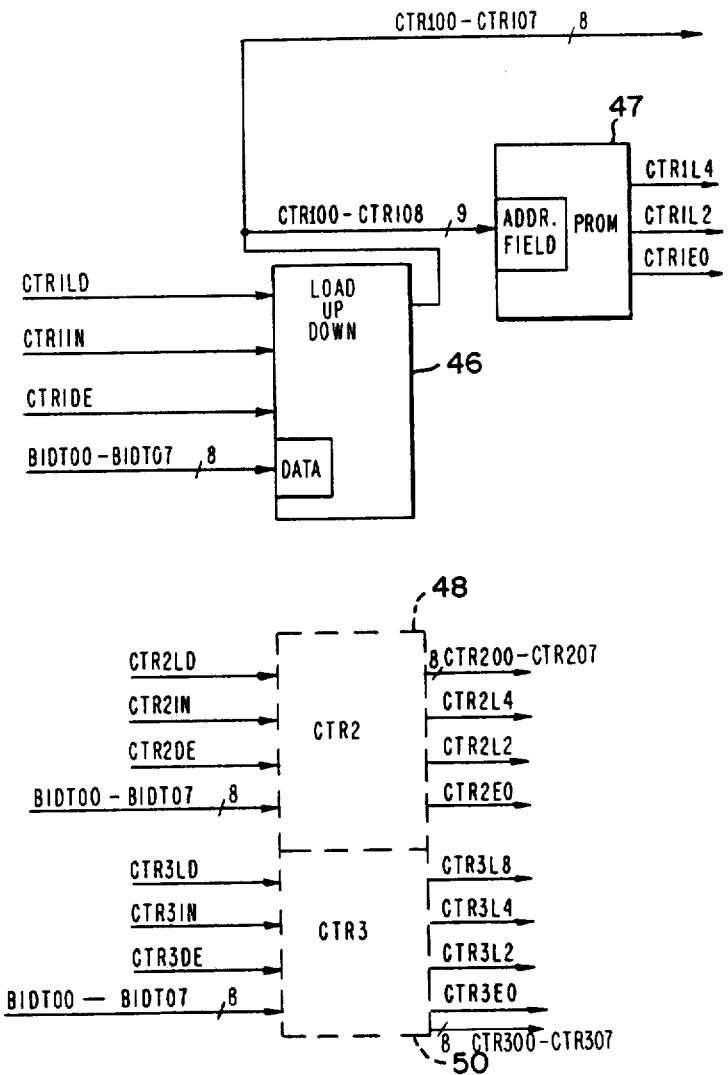
Figures 7D, 7E:
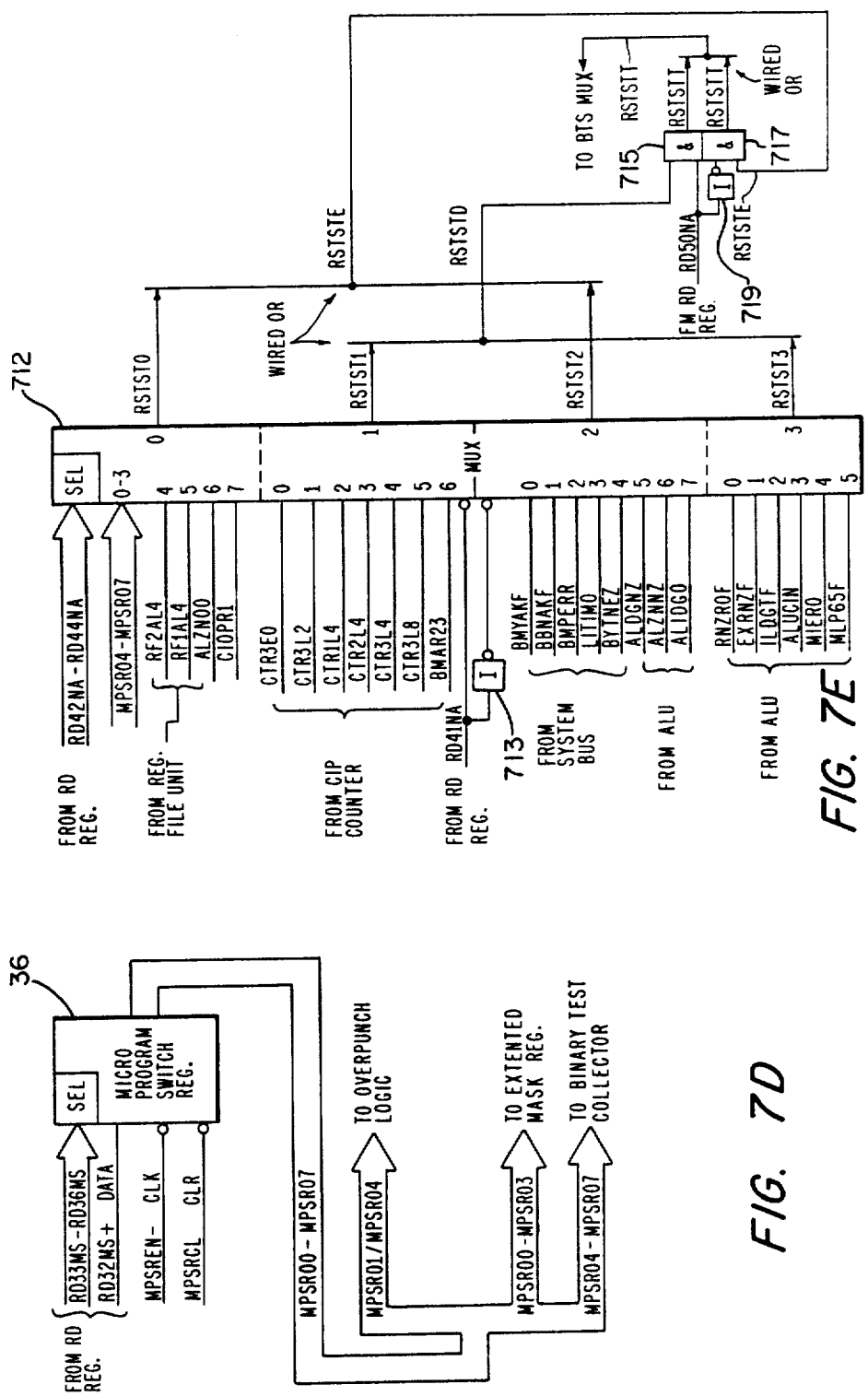
Figure 7F:
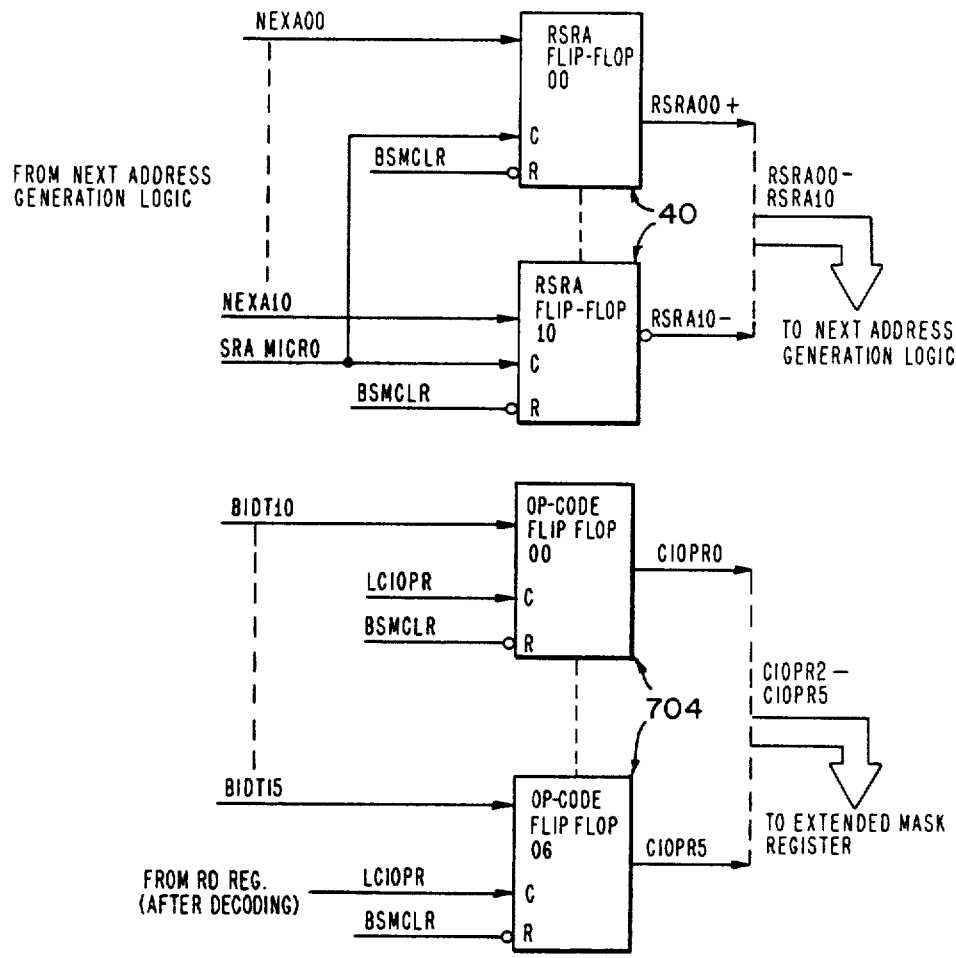

With reference to FIG. 7C, and with respect to the description of counter 1, which is shown in detail, the outputs of the counter 1 being CTR100 through CTR107 are coupled to the PROM chip 47. This PROM chip has on its output the conditions of counter 1 equal to 0 (CRT1E0), counter 1 less than 2 (CRT1L2), and counter 1 less than 4 (CTR1L4). This PROM chip is duplicated for each one of the other two counters, namely counter 2 (48) and counter 3 (50). Basically, the PROM chip takes all the 8 bits of the counters and decodes them to determine whether their values are equal to 0, less than 2, less than 4, or in the case of counter 3, less than 8. One reason for using a PROM chip for this logic instead of a typical gating structure, is that it saves physical space. If this decode logic was provided by use of typical hardware (i.e., small scale integrated circuits such as AND and OR gates) it would have taken about three chips of logic per counter to decode their respective values. By using the PROM chip for doing this decode, a significant amount of real estate (physical space) was saved.

FIG. 7A depicts the final selection of NEXA00 through NEXA10 which, via the ROS address 710, are coupled for transfer to the control store 10. The control functions NEXAS0 and NEXAS1, which are widely used in the logic of this FIG. 7A, are explained in the truth table of FIG. 9. FIG. 9 is a truth table for generation of the two control functions NEXAS0 and NEXAS1. In this truth table, the second column contains the different values of bits RD38RB through RD40BR. Column 3 contains the possible codes for the control signals NEXAS0 and NEXAS1 and the corresponding microinstructions which are generated. For example, NEXAS0 is true, if RD38BR is true, or if RD39BR is true, this corresponds to the codes shown in Column 3 for 100, 101, 110 and 111 and also 010 and 011. The first four codes starting at 100 to 111 are generated for the three microinstructions BRM, BRMEX and BMA, and the code 010 is generated for the microinstruction RAS. For these four microinstructions BRM, BRMEX, BMA and RAS, NEXAS0 is true. NEXAS0 negation is true for the two codes of 000 or 001, which correspond to the microinstructions BUN and BTS respectively.

A similar explanation for NEXAS1 generation will now be made. NEXAS1 is true for bit RD38BR being true, or RD40BR being true. This in turn corresponds to the codes of 100 through 111 and 001 and 011. The first four codes correspond to the microinstruction BRM, BRMEX and BMA, and the code of 001 corresponds to the microinstruction BTS. It should be noted that the code 011 is not used at all. Similarly, NEXAS1 negation is true for the code of 000, or a 010, which corresponds to the microinstructions BUN and RAS respectively.

These functions NEXAS0 and NEXAS1, along with their negations, NEXAS0 negation and NEXAS1 negation, are used extensively to control the multiplexer selection in FIG. 7A. A more detailed explanation of FIG. 7A, which depicts the generation of NEXA00 through NEXA10 to be used for the control store address, will now be made.

The high order 4 bits, NEXA00 through NEXA03, have a possibility of three inputs and these inputs could be either directly from RD41NA through RD44NA, or from the ROS return address register RSRA00 through RSRA03, and lastly from the ROS page register RSPG00 through RSPG03. The selection of RD41NA through RD44NA is for the microinstruction BUN, which is the unconditional branch, taking the data directly from the ROS data register. The selection of the RSRA00 through RSRA03, that is from the ROS return address register, is for the microinstruction RAS. The selection of RSPG00 through RSPG03, that is the ROS base register, is for all other microinstructions which are BRM, BRMEX and BMA. The selection between RD41NA through RD44NA and RSRA00 through RSRA03 is accomplished through the multiplexer 712. The selection of RD41 through RD44 is provided for the microinstruction BUN, which is controlled by RD39BR negative, and when RD39BR is positive, that is it is true, the output of the MUX is selected from the ROS return address register. The output of this MUX is called NART00 through NART03. The final selection of NART00 through NART03 and RSPG00 through RSPG03 is accomplished by the enable lines on the multiplexer 712 and the register 730 which is the ROS page register explained earlier.

Referring again to FIG. 9, which is the truth table, it shows that NEXAS1 being true corresponds to the microinstructions BTS, BRM, BRMEX or BMA, whereas NEXAS1 negation being true corresponds to the microinstructions BUN or RAS. Hence, NEXAS1 controls the enabling and disabling of the multiplexer 712 and the register 730. If NEXAS1 is true, that is, there is either a BTS, BRM or BRMEX in process, then the ROS page register 730 is enabled by the function NEXAS1 (negative) going negative. If NEXAS1 (negative) is true, which corresponds to microinstructions BUN or RAS, NEXAS1 going negative enables the multiplexer 712. The outputs of elements 712 and 730 are wire ORed together and the final output is the low order 4 bits of the next address NEXA00 through NEXA03.

NEXA04 is controlled by the two AND gates 714 and 716. The outputs of these AND gates NEXA04B and NEXA04A respectively are wire ORed together to form the address NEXA04. The two possible sources of NEXA04 are either the ROS return address register or directly from the ROS data register RD45NA. The ROS return address register RSRA bit 4 is enabled by the function NEXRAS which is generated for the RAS microinstruction. When NEXRAS is true, the output of NEXA04B follows the contents of RSRA bit 4, and is used to generate the output NEXA04. Whereas if NEXRAS (negation) is true, then the output NEXA04A is enabled and it follows the contents of RD45NA. These two wire ORed functions NEXA04A and NEXA04B together form the bit NEXA04 of the next address.

The control of the final low order six bits of the next address logic, NEXA05 through NEXA10 is accomplished via the multiplexer 718. This multiplexer is a 1 out of 4 multiplexer and is controlled by two control lines, NEXAS0 and NEXAS1, which can have values 00, 01, 10 and 11 respectively. These are depicted in the diagram of the multiplexer 718 as being the select code 0, select code 1, select code 2 and select code 3. The select code 0 is the case where NEXAS0 negation is true and NEXAS1 negation is true. That corresponds to the case of the BUN microinstruction which is the unconditional branch. In this case, the contents of RD46NA through RD51NA which are directly from the control store word are enabled on the output to form NEXA05 through NEXA10. The next case when select 1 is true, that is NEXAS0 negation is true and NEXAS1 assertion is true, is the case where the BTS microinstruction is enabled. In the case of the BTS microinstruction, the six lines which are RD46NA through RD49NA and the final output of the test MUX 712 shown on FIG. 7E, as the output of the wire ORed output of elements 715 and 717, along with RD51NA in that order are enabled on the output NEXA05 through NEXA10.

The selection 2, which is the case with any NEXAS0 assertion being true and NEXAS1 negation being true, corresponds to the microinstruction RAS, which is the return after subroutine microinstruction. In this particular case, the ROS return address register, bits 05 through 09, and the ROS return address register RSRA10 negation, is enabled on the output NEXA05 through NEXA10. The final select output control 3 is the case where NEXAS0 and NEXAS1 are both true. This is the case for the microinstructions BRM, BRMEX and BMA. In this case, the NEXM05 through NEXM08, which are the outputs of the multiplexer 736 of FIG. 7B, along with RD50NA and RD51NA, are enabled onto NEXA05 through NEXA10. Thus, the multiplexer 718 controls the output for NEXA05 through NEXA10 for the next address generation. Finally, these 11 bits, NEXA00 through NEXA10, from the ROS address as depicted in the block 710 are coupled to the control store for completion of the next address.

Having described the invention, what is claimed as new and novel and for which it is desired to secure Letters Patent is:

1. A data processor comprising:
    A. a control store having a plurality of locations, each said location for storing a control word, having a plurality of portions, for use in controlling the operation of said processor;
    B. first means for receiving a plurality of signals indicative of status information of said data processor;
    C. second means for receiving an instruction indicative of address information for use in addressing said control store;
    D. third means for receiving a first selected portion of an addressed one of said control words;
    E. first multiplexer means having an output for coupling to said output either said signals indicative of said status information or said selected portion of said addressed one of said control words;
    F. means for decoding said information received by said second means for receiving;
    G. means for selecting either said signals or said selected portion at said output of said first multiplexer means or for selecting said information received by said second means for receiving as decoded by said means for decoding;
    H. second multiplexer means having an output and a plurality of inputs, a first one of said inputs coupled to said means for selecting and a second one of said inputs coupled to receive a second portion of an addressed one of said control words from said control store; and
    I. means, coupled to said output of said second multiplexer means, for addressing said control store by means of one of said inputs received by said second multiplexer means.

2. A processor as in claim 1 wherein said first means for receiving is a plurality of gates coupled to pass said first multiplexer means is an asynchronous manner.

3. A processor as in claim 2 wherein said gates are of the type which provide an AND function.

4. A processor as in claim 3 wherein said gates are enabled to pass said signals in response to a first level of one of a plurality of bits in an addressed one of said control words.

5. A processor as in claim 4 further comprising:
    A. a first register for receiving data representative of a mask pattern for use in transferring only selected bits of information as determined by said mask pattern; and
    B. means, responsive to a second level of said one of said plurality of bits, for enabling said data received in said first register to be transferred to said first multiplexer means.

6. A processor as in claim 1 further comprising:
    A. a page register for storing a plurality of bits of information;
    B. means for coupling said page register and an addressed one of said words from said control store to third and fourth inputs respectively of said second multiplexer means;
    C. first selection means responsive to a first instruction for enabling only the fourth input of said second multiplexer means to be coupled to the output thereof; and
    D. second selection means responsive to a second instruction for enabling a predetermined portion of said control word and said plurality of bits in said page register to be coupled to said output of said second multiplexer means.

7. A processor as in claim 6 wherein said control store includes a plurality of pages, each of said pages including a plurality of said locations, wherein the number of said plurality of bits in said page register is sufficient to address any one of said pages, and wherein said predetermined portion of said control word has included therein a sufficient number of bits to address each of said locations in each of said pages.

8. A processor as in claim 1 wherein said said instruction received by said second means for receiving is indicative of branch address information for use in addressing a said location in said control store which is non-contiguous with a presently addressed one of said locations in said control store.

9. A processor as in claim 1 further comprising:
    A. further means for receiving yet further information indicative of the test status of said data processor; and
    B. means for coupling said further means for receiving to a further said input of said second multiplexer means for use in addressing said control store.

10. A processor as in claim 1 further comprising:

A. a return from subroutine address register;

B. means for storing a return address in said return address register;

C. means for coupling said means for storing to a further input of said second multiplexer means; and D. means responsive to a predetermined instruction, for addressing said control store by means of said second multiplexer only, by use of the return address stored in said means for storing.

* * * * *